(12) United States Patent
Matula et al.

(10) Patent No.: US 7,194,498 B2
(45) Date of Patent: Mar. 20, 2007

(54) HIGHER RADIX MULTIPLIER WITH SIMPLIFIED PARTIAL PRODUCT GENERATOR

(75) Inventors: David William Matula, Dallas, TX (US); Peter-Michael Seidel, Dallas, TX (US); Lee D. McFearin, Plano, TX (US)

(73) Assignee: Southern Methodist University, Dallas, TX (US)

( * ) Notice: Subject to any disclaimer, the term of this patent is extended or adjusted under 35 U.S.C. 154(b) by 532 days.

(21) Appl. No.: 10/080,707

(22) Filed: Feb. 25, 2002

(65) Prior Publication Data

US 2003/0018678 A1    Jan. 23, 2003

(51) Int. Cl.
*G06F 7/52*    (2006.01)

(52) U.S. Cl. .................. 708/620; 708/501; 708/624

(58) Field of Classification Search ............... 708/620, 708/625, 628, 631, 519, 542, 491, 624, 627; 713/174

See application file for complete search history.

(56) References Cited

U.S. PATENT DOCUMENTS 5,150,322 A * 9/1992 Smith et al. ............ 708/628
5,297,206 A * 3/1994 Orton .................... 380/30
5,828,590 A * 10/1998 Chen et al. .............. 708/628

* cited by examiner

*Primary Examiner*—Gertrude A. Jeanglaude
(74) *Attorney, Agent, or Firm*—Nixon Peabody, LLP; Raymond Van Dyke

(57) ABSTRACT

A circuit and methodology for higher radix multiplication with improved partial product generation. The invention relates to the design of a high precision multiplier for an arithmetic unit of a digital processor.

18 Claims, 3 Drawing Sheets

Simplified block diagram of partial product generation for preferred embodiment radix-32 encoding with postcomputation by 7x multiplier

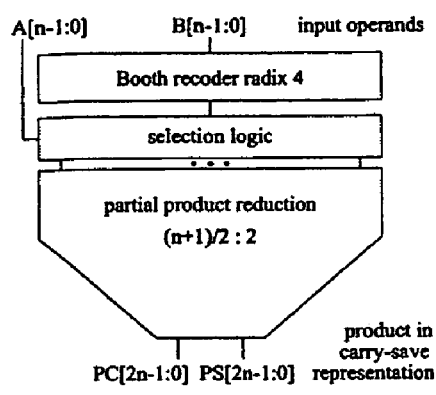

Figure 1A
-Prior Art-
Block diagram of partial product generation for prior art Booth radix-4 multiplier

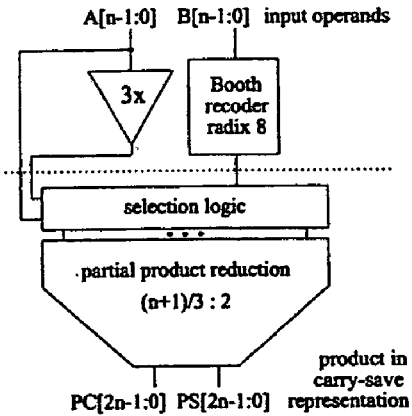

Figure 1B
–Prior Art–
Block diagram of partial product generation for prior art Booth radix-8 multiplier

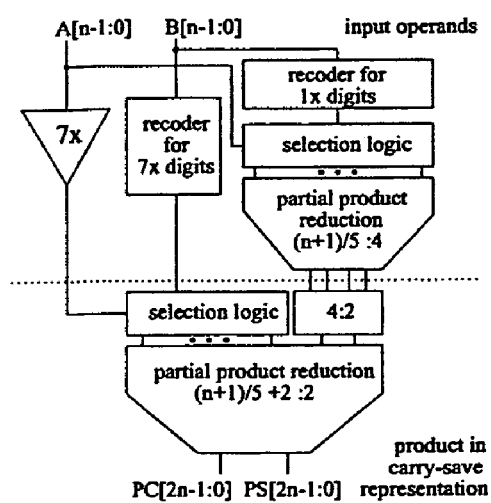

Figure 2A
Simplified block diagram of partial product generation for radix-32 recoding with precomputation of 7x multiplicand

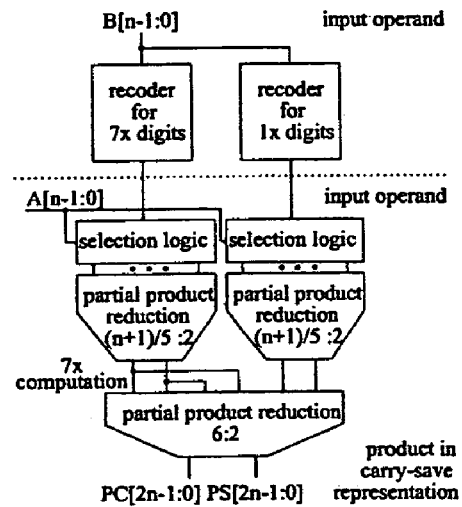

Figure 2B
Simplified block diagram of partial product generation for preferred embodiment radix-32 encoding with postcomputation by 7x multiplier

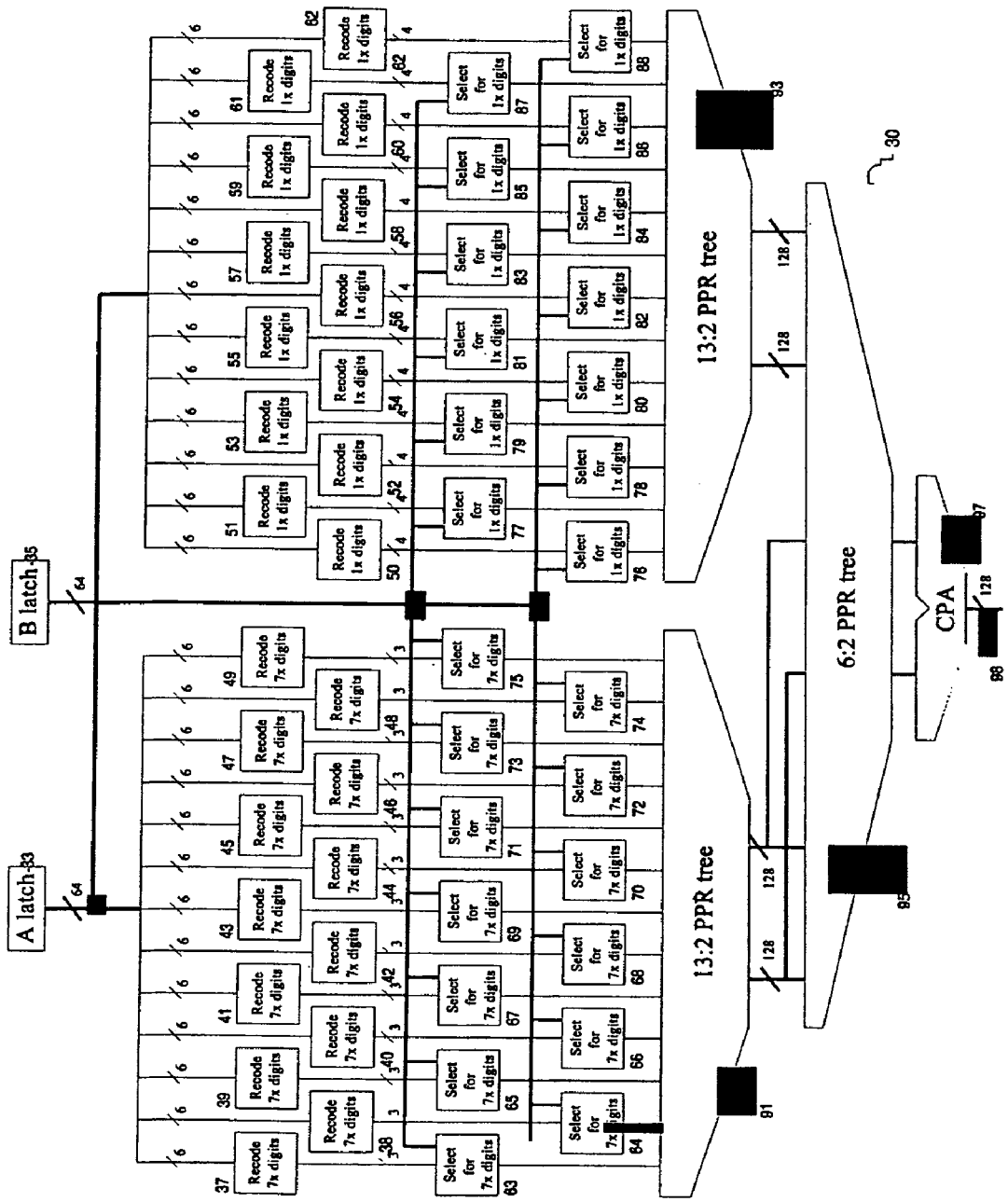
Figure 3: Block diagram of the preferred embodiment of the invention for a multiplier bit width of $p = 64$.

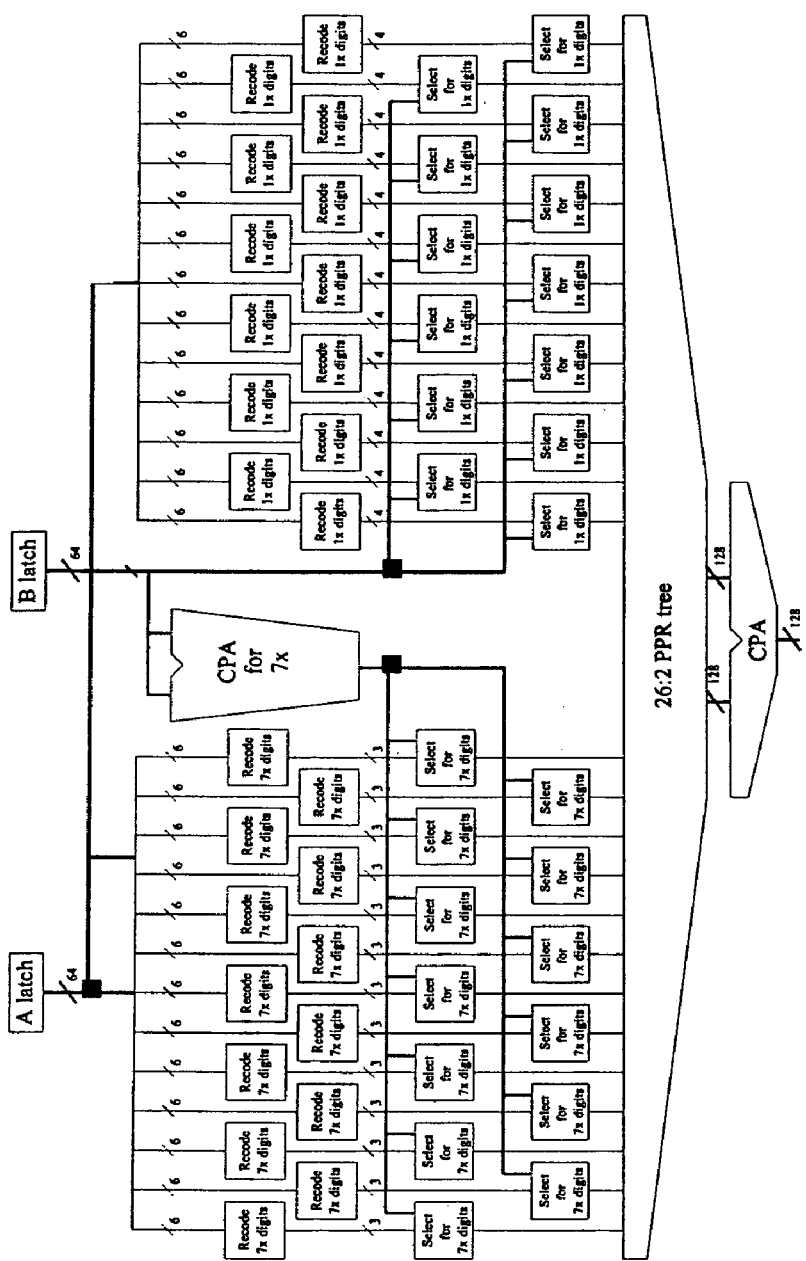
Figure 4: Block diagram of the precomputation option illustrating a further embodiment of the invention for a multiplier bit width of $p = 64$.

HIGHER RADIX MULTIPLIER WITH SIMPLIFIED PARTIAL PRODUCT GENERATOR

FIELD OF THE INVENTION

This invention relates in general to the field of methods for design of digital devices. More particularly, the invention relates to the design of a high precision multiplier for an arithmetic unit of a digital processor.

BACKGROUND OF THE INVENTION

The arithmetic unit is one of the most important components of any integrated electronic data processing system. A high precision multiplier is a fundamental part of the arithmetic unit as multiplication is one of the most frequently performed arithmetic operations. Multipliers are large and relatively slow blocks in most processors, and for this reason their implementation has a critical impact on cycle time and processor area.

Without limiting the scope of the invention this background is provided on the terminology associated with multipliers for arithmetic units employing what is typically termed higher radix Booth recodings of the multiplier.

For a bit-string $a=a[p-1:0]=(a[p-1], \ldots, a[0])=(a_{p-1}, \ldots, a_0) \in \{0,1\}^p$ we denote by $$\langle a \rangle = \sum_{i=0}^{p-1} a[i] \cdot 2^i$$

the binary number represented by a.

A p'×p-multiplier is a circuit with p' inputs $a=a[p'-1:0]$, p inputs $b=a[p-1:0]$, and p'+p outputs $c=c[p'+p-1:0]$, such that $\langle a \rangle \cdot \langle b \rangle = \langle c \rangle$ holds.

For binary multiplication, in general, binary p'×p-multipliers are implemented with a first step of generating the product in a carry-save representation and a second step of compressing the carry-save representation to a binary representation of the product. We focus on implementation of the first step. In the simplest form the product computation is based on the sum:

$$\langle c \rangle = \sum_{i=0}^{p-1} \langle a \rangle \cdot b[i] \cdot 2^i \quad (1)$$

with the partial products: $S_i = \langle a \rangle \cdot b[i] \cdot 2^i$. These partial products have to be generated and compressed to a carry-save representation. The generation of the partial products corresponding to (1) simply consists of logical AND-gates. Except for optimizing the logical and physical implementation of the partial product reduction, the main approach to decrease the delay and size of the partial product reduction is to decrease the number of partial products in (1) by representing one of the operands in a higher radix.

For higher radix partial product generation, let a p-digit string in radix $\beta$ denote the radix polynomial $$(d_{p-1}, d_{p-2}, \ldots, d_0)_\beta = d_{p-1}\beta^{p-1} + d_{p-2}\beta^{p-2} + \ldots + d_0 \in P[\beta, D].$$

Here, $\beta \geq 2$ is the radix, D is the digit set with $d_i \in D$ for $0 \leq i \leq p-1$, and the radix system $P[\beta, D]$ denotes the set of all radix polynomials with radix $\beta$ and digits from D.

For the product A·B of the p-bit integer multiplicand $A=\langle a \rangle$ and the p-bit integer multiplicand $B=\langle b \rangle$, let the multiplier be represented by a $$p' = \left\lceil \frac{p+1}{k} \right\rceil$$

digit polynomial in the balanced minimally redundant (Booth digit) system $P\lfloor 2^k, \{-2^{k-1}, -2^{k-1}+1, \ldots, 2^{k-1}\} \rfloor$. Each term of the product $$A \cdot B = \sum_{i=0}^{p'-1} A \cdot d_i \cdot 2^{ki}$$

is a higher radix partial product of the form $$A \cdot d_i 2^{ki} = -(1)^S \cdot 2^e \cdot (jA), j \in \{1, 3, \ldots, 2^{k-1}-1\}.$$

TABLE 1

Complexity of partial product generation for various Booth recodings (p = 64).

| Radix | Primitive Part. Prods (jA) | # Partial Products | PPG Fanin | Fanout Primitive PP's | Total PPG Fanin |
|---|---|---|---|---|---|
| 2 | 1 | 64 | 1 | 64 | 64 |
| 4 | 1 | 33 | 1 | 33 | 33 |
| 8 | 2 | 22 | 2 | 22 | 44 |
| 16 | 4 | 17 | 4 | 17 | 68 |
| 32 | 8 | 13 | 8 | 13 | 124 |

This allows each higher radix partial product to be created from a set of $2^{k-2}$ primitive partial products (jA) by a conditional shift and/or complement. Five metrics are provided in Table 1 for comparing the consequences of employing higher radix Booth recodings on a 64-bit operand. The number of primitive partial products that must be computed and routed to each partial product generator (PPG) grows linearly with the base $\beta$ while the number of partial products that must be driven to each PPG decreases inversely with lg $\beta$. A measure of multiplier circuit routing complexity is the total PPG-fanin given by the number of primitive partial products that must be routed into each PPG summed over all PPGs. The necessity of routing each primitive partial product (jA) to each of the PPGs causes the total PPG-fanin to grow for $\beta \geq 4$.

Radix-4 has a clear advantage in these metrics over the host radix-2. The reduction by one half in the number of partial products and total PPG-fanin is obtained simply by the facility of the PPG units to conditionally complement and/or perform a one bit shift.

Moving to radix-8 further reduces the number of partial products by a third while adding the complexity and delay of a 2-1 add to precompute an additional primitive partial product (3A). This tradeoff is more acceptable for higher precisions in terms of adder complexity, but the routing of the two primitive values to each PPG increases the total PPG fanin.

Moving to radices 16 and 32 only marginally reduces the number of partial products while greatly increasing the partial product complexity both in number of primitive partial products and total fanin to the PPGs.

With this background we then note that prior art implementations of multipliers generally employ either radix-4 or radix-8, and it is helpful to focus on the features and disadvantages of these systems. FIG. 1A provides a block diagram of a prior art Booth radix-4 multiplier and FIG. 1B provides a block diagram of a prior art Booth radix-8 multiplier for comparing features.

Implementation of a (p'×p)-bit multiplier involves the accumulation of p partial products of the p'-bit multiplicand. Booth recoding of the multiplier to radix 4 with digits {−2,−1,0,1,2} reduces the number of partial products to $$\left\lceil \frac{p+1}{2} \right\rceil,$$

where each partial product is obtained by shifting and/or complementing the multiplicand for each non zero digit. Radix 4 recoding thus reduces the multiplier size by about 50% and provides more flexibility in reducing the cycle time of an implementation.

Booth radix 8 multiplier recoding with digits {−4,−3,−2,−1,0,1,2,3,4} reduces the number of partial products to $$\left\lceil \frac{p+1}{3} \right\rceil$$

realizing a further 33% size reduction in the number of partial products. However, radix 8 recoded multipliers have several inherent disadvantages over radix 4 recoded multipliers. In particular:

(i) Multiplier precomputation: Radix 8 recoding requires the area and delay of a carry propagate adder to precompute a 3×-multiplicand partial product.

(ii) (ii) Multiplicand routing: Both the 1×-multiplicand and 3×-multiplicand are high precision operands that must be routed to substantially all partial product generators (PPGs).

(iii) (iii) Partial product generation: The partial product generator must select either the 1× or 3×multiplicand as well as shift and/or complement the term for each non-zero digit.

Accordingly, a need has arisen for a multiplier method and design reducing the number of partial products to be accumulated below $$\left\lceil \frac{p+1}{2} \right\rceil$$

while avoiding the precomputation adder area and delay of obtaining a 3× multiplicand. A further need has arisen to avoid the multiplicand routing and PPG selection complexity of sending two distinct multiples of the multiplicand to each PPG.

SUMMARY OF THE INVENTION

In accordance with the present invention a multiplier recoding and partial product generation method and multiplier system are provided where the number of partial products can be reduced to $$\left\lceil \frac{2(p+1)}{5} + 2 \right\rceil$$

achieving over a 15% further reduction over Booth radix-4 for sufficiently large p where no precomputed multiplier of the multiplicand need be determined, and where each PPG receives only the input multiplicand for selective shift and/or complementation.

We obtain these properties by a novel operand recoding scheme for the implementation of higher radix multiplication. In particular, we investigate the design of multipliers radix-32 and radix-256. For these higher radix multipliers each of the higher radix digits is recoded employing a secondary radix. Specifically, each radix-32 digit is represented by two radix-7 digits, and each radix-256 digit is represented by three radix-11 digits. Hence, a p-bit multiplier is represented by roughly 2p/5 resp. 3p/8 terms. The novel feature of our secondary radix recoding is that all the non zero digit magnitudes are a power of two, which simplifies the implementation of the partial product generation. The partial products depending on multiples of the radices 7 or 11 can be separately accumulated, with multiplication by the radix a pre- or post-computation option.

An important technical advantage of the present method is that the multiplication by the secondary radix can be accomplished within the structure of the PPR adder tree requiring the accumulation of only a couple of extra partial products (two for secondary radix-7) with that number independent of the overall multiplier size. A second technical advantage of the present invention is the simplified routing achieved by having only one version of the multiplicand routed to each PPG. For a very large (p'×p)-bit multiplier where p' may be twice or more the size of p, the need to send only one p' bit operand to each of a reduced number of PPGs is a clear advantage. A third feature of our preferred secondary radix-7 implementation is that half of the PPGs are standard Booth radix-4 PPGs and the other half are simplified versions of Booth radix 8 PPGs accepting only the digits {−4,−2,−1,0,1,2,4}.

BRIEF DESCRIPTION OF THE DRAWINGS

FIG. 1A presents a schematic diagram for a prior art multiplier design employing Booth radix-4 recodings and FIG. 1B presents a schematic diagram for a prior art multiplier design employing Booth radix-8 recodings.

FIG. 2A presents a simplified schematic diagram of partial product generation for radix 32 recoding with precomputation of 7× multipliers and FIG. 2B presents a simplified schematic diagram of partial product generation for a preferred embodiment radix 32 recoding with post-computation of 7× multipliers.

FIG. 3 is a detailed block diagram of a presently-preferred embodiment with primary radix 32, secondary radix 7, and with multiplication by 7 incorporated in a portion of the PPR tree.

FIG. 4 is a detailed block diagram of a further embodiment also using radix 32, with multiplication of the multiplicand by the secondary radix shown as a precomputation step.

DETAILED DESCRIPTION OF THE INVENTION

The multiplier unit of the present invention uses a novel method for multiplier recoding and for computing and accumulating the partial products. In particular an initial high binary power radix is chosen and the standard Booth digits for that radix are themselves recoded using a secondary radix.

Secondary Radix Operand Recoding

Consider a minimally redundant (Booth) radix polynomial representation $$B = \sum_{i=0}^{p'-1} d_i 2^{ki}$$

for very high k, in particular $5 \leq k \leq 12$. The Booth digit ranges expand from $-16 \leq d_i \leq 16$ for k=5 up to $-2048 \leq d_i \leq 2048$ for k=12. To reduce the partial product complexity these large digit ranges are represented by a two to four digit number in a secondary radix $\gamma$ where the non-zero digits $d \in D^*$ for the secondary radix system $P \lfloor \gamma, D^* \rfloor$ are exclusively restricted to signed binary powers $d=(-1)^s 2^n$ for s=0,1; n=0,1,2, . . . . The possibility of such systems will first be illustrated by a simple example.

Our primary radix is $\beta=32$ with Booth digit set D={-16,-15, . . . ,16}. Our secondary radix is $\gamma=7$ with a digit set {-4,-2,-1,0,1,2,4} where digit values are only signed binary powers or zero. Table 2 provides a lookup table illustrating the recoding as a three step process. The first column provides the 6-bit inputs which are taken to have weights -16,8,4,2,1,1 corresponding to a leading 5-bit 2's complement integer followed by a low order bit carry in. Higher radix representation of the integer input value is first given in the table as a single "Booth" digit radix-32 and then as a two digit radix-7 value which is uniquely determined for $-16 \leq d_i < 16$ by $$d_i = d_{i,1} \cdot 7 + d_{i,0}, \ d_{i,1}, d_{i,0} \in \{-4,-2,-1,0,1,2,4\}.$$

As a third step the radix-7 digits are finally given in Table 2 in encoded form using a sign and magnitude select bit encoding. Our 64×64 bit product A·B using a secondary radix representation for B can be expressed as $$A \cdot B = (7A) \cdot \sum_{i=0}^{12} (d_{i,1} 32^i) + (A) \cdot \sum_{i=0}^{12} (d_{i,0} 32^i). \quad (2)$$

The right hand side of (2) has 26 partial products, achieving a reduction more than halfway between that of Booth radix-4 and radix-8. These 26 partial products are partitioned into two groups, 13 of which employ the primitive partial product (7A), and 13 of which employ (A) giving a total PPG fanin of only 26. Two options are possible with these simplified partial products noting that $d_{i,j} 32^i = (-1)^s 2^n$ or 0 for all $0 \leq i \leq 12$, $0 \leq j \leq 1$.

Pre-compute (7A). The primitive partial product can be precomputed by a shift and add (7A=8A−A) while the $d_{i,j}$ are obtained from a recoder or recoding table.

Post-compute (7A). The higher order summation can utilize a 13:2 adder tree compressing $$\sum_{i=0}^{12} A(d_{i,1} 32^i)$$

to a redundant (e.g. carry save) sum z. Then the post computation can add 8z−z to the low order sum $$y = \sum_{i=0}^{12} A(d_{i,0} 32^i)$$

output a second 13:2 adder tree. The value of 8z−z+y is completed by a 6:2 compressor and a 2-1 addition.

TABLE 2

Primary radix-32, secondary radix-7 operand digit recoding.

| binary plus carry input b[5i + 4:5i − 1] | higher radix conversion | | secondary radix-7 encoding | | | | | |
|---|---|---|---|---|---|---|---|---|
| | digit radix-32 | digits radix-7 | $s_7$ | $x_{14}$ | $x_7$ | $s_1$ | $x_4$ | $x_2$ | $x_1$ |
| 100000 | −16 | $2\bar{2}$ | 1 | 1 | 0 | 1 | 0 | 1 | 0 |
| 100001,100010 | −15 | $2\bar{1}$ | 1 | 1 | 0 | 1 | 0 | 0 | 1 |
| 100011,100100 | −14 | $\bar{2}0$ | 1 | 1 | 0 | dc | 0 | 0 | 0 |
| 100101,100110 | −13 | $\bar{2}1$ | 1 | 1 | 0 | 0 | 0 | 0 | 1 |
| 100111,101000 | −12 | $\bar{2}2$ | 1 | 1 | 0 | 0 | 0 | 1 | 0 |
| 101001,101010 | −11 | $\bar{1}\bar{4}$ | 1 | 0 | 1 | 1 | 1 | 0 | 0 |
| 101011,101100 | −10 | $\bar{2}4$ | 1 | 1 | 0 | 0 | 1 | 0 | 0 |
| 101101,101110 | −9 | $\bar{1}\bar{2}$ | 1 | 0 | 1 | 1 | 0 | 1 | 0 |
| 101111,110000 | −8 | $\bar{1}\bar{1}$ | 1 | 0 | 1 | 1 | 0 | 0 | 1 |
| 110001,110010 | −7 | $\bar{1}0$ | 1 | 0 | 1 | dc | 0 | 0 | 0 |
| 110011,110100 | −6 | $\bar{1}1$ | 1 | 0 | 1 | 0 | 0 | 0 | 1 |
| 110101,110110 | −5 | $\bar{1}2$ | 1 | 0 | 1 | 0 | 0 | 1 | 0 |
| 110111,111000 | −4 | $0\bar{4}$ | dc | 0 | 0 | 1 | 1 | 0 | 0 |
| 111001,111010 | −3 | $\bar{1}4$ | 1 | 0 | 1 | 0 | 1 | 0 | 0 |
| 111011,111100 | −2 | $0\bar{2}$ | dc | 0 | 0 | 1 | 0 | 1 | 0 |
| 111101,111110 | −1 | $0\bar{1}$ | dc | 0 | 0 | 1 | 0 | 0 | 1 |
| 111111,000000 | 0 | 00 | dc | 0 | 0 | dc | 0 | 0 | 0 |
| 000001,000010 | 1 | 01 | dc | 0 | 0 | 0 | 0 | 0 | 1 |
| 000011,000100 | 2 | 02 | dc | 0 | 0 | 0 | 0 | 1 | 0 |
| 000101,000110 | 3 | $1\bar{4}$ | 0 | 0 | 1 | 1 | 1 | 0 | 0 |
| 000111,001000 | 4 | 04 | dc | 0 | 0 | 0 | 1 | 0 | 0 |
| 001001,001010 | 5 | $1\bar{2}$ | 0 | 0 | 1 | 1 | 0 | 1 | 0 |
| 001011,001100 | 6 | $1\bar{1}$ | 0 | 0 | 1 | 1 | 0 | 0 | 1 |
| 001101,001110 | 7 | 10 | 0 | 0 | 1 | dc | 0 | 0 | 0 |
| 001111,010000 | 8 | 11 | 0 | 0 | 1 | 0 | 0 | 0 | 1 |
| 010001,010010 | 9 | 12 | 0 | 0 | 1 | 0 | 0 | 1 | 0 |
| 010011,010100 | 10 | $2\bar{4}$ | 0 | 1 | 0 | 1 | 1 | 0 | 0 |
| 010101,010110 | 11 | 14 | 0 | 0 | 1 | 0 | 1 | 0 | 0 |
| 010111,011000 | 12 | $2\bar{2}$ | 0 | 1 | 0 | 1 | 0 | 1 | 0 |
| 011001,011010 | 13 | $2\bar{1}$ | 0 | 1 | 0 | 1 | 0 | 0 | 1 |
| 011011,011100 | 14 | 20 | 0 | 1 | 0 | dc | 0 | 0 | 0 |
| 011101,011110 | 15 | 21 | 0 | 1 | 0 | 0 | 0 | 0 | 1 |
| 011111 | 16 | 22 | 0 | 1 | 0 | 0 | 0 | 1 | 0 |

Note that the post-computation preferred embodiment option utilizes only two more partial products and one additional level of 3-to-2 adder delay to avoid the complexity of a 2-1 adder to pre-compute (7A). If multiplier digit recoding is performed in the first cycle of a pipelined multiplier, the post-computation option allows the product to be fed back as the multiplicand of a dependent multiply operation entering on the second cycle. This effectively reduces pipeline stall by one cycle on dependent multiplications.

The theory of secondary radix recodings is developed in the literature, e.g., Proc. IEEE Int. Symp. on Comp. Arith. (Arith15), *Binary Multiplication Radix-32 and Radix-256*, pp. 23–32, 2001.

Secondary Radix Multiplier Designs

In this section we propose multiplier designs on the basis of the secondary radix recoding schemes from the previous section. The proposed recoding schemes share the following features, that will be utilized in the designs: There are very few digits to be considered in the secondary radix representations. All digits in the secondary radix system are powers of two. All weights in the secondary radix system can be computed by two or three term sums.

If p" denotes the number of digits that are required in the secondary radix representation of a higher radix digit, then $\lceil (p+1)/k \rceil \cdot p$" digits are required to represent the multiplier <b>. Thus, in comparison with binary the number of digits is reduced by roughly k/p" which is 5/2, 8/3 or 3 in the cases we consider. Additionally these digits are simple multiples, and even the multiplication by the weights can be computed by simple sums. This is not very different from the properties of Booth recoding radix-8. The main new flexibility for the implementations is given by the following properties: Each digit depends on only one odd multiple which could be 1 and is known at design time. Only some of the digits in the secondary radix have to be weighted by a 'hard' multiple. These 'hard' multiples are computed unconditionally, they do not depend on the value of the digits in the secondary radix. The low order digits do not have to deal with 'hard' multiples.

Based on these properties we suggest two basic architectures for the design of partial product generation and reduction as illustrated in FIGS. 2A and 2B:

Architecture I: Pre-Computation of Hard Multiples. Referring to FIG. 2A, the multiplications by the weights of the secondary representation are computed on the multiplicand <a>. In parallel the multiplier <b> is recoded and the partial products corresponding to the low order digits (which do not have to deal with any hard multiples) are generated and can already be partially reduced. These are combined with the remaining partial products in a second partial product reduction step.

Architecture II: Post-Computation of Hard Multiples. Referring to FIG. 2B, after recoding the multiplier <b> into the digits of the secondary radix system, the multiples of the multiplicand <a> by these digits (note that these are only multiples by powers of two) are generated. The terms that we get from this selection are accumulated separately in groups that share the same weights of the corresponding digits in the secondary radix system. The carry-save representation of the sum of each of these groups is then multiplied by the corresponding weight (note that these multiples can be computed by simple sums). The results are accumulated to get the carry-save representation of the product in a final partial product reduction step.

Radix-32 Architecture of the Multiplier

The encoding scheme for the proposed implementations is based on a radix-32 signed digit representation of the multiplier:

$$\langle b \rangle = \sum_{i=0}^{p'-1} d_i \cdot 32^i,$$

so that the multiplier is represented by $p' = \lceil (p+1)/5 \rceil$ radix-32 digits $d_i \in \{-16, -15, \ldots, 16\}$. Corresponding to Booth recoding a canonical choice for the digits $d_i$ is computed from the binary representation of $b = \langle b[p-1:0] \rangle$ by:

$$d_i = -16b[5i+4] + 8b[5i+3] + 4b[5i+2] + 2b[5i+1] + b[5i] + b[5i-1]$$

As suggested in the previous section each radix-32 digit $d_i$ can be represented by two digits in the secondary radix-7:

$$d_i = d_{i,1} \cdot 7 + d_{i,0},$$

where both $d_{i,1}$ and $d_{i,0}$ are a power of two. The high order radix-7 digits $d_i$ can only have values from the set $\{-2,-1,0,1,2\}$ and the low order radix-7 digits $d_{i,0}$ can only have the values $\{-4,-2,-1,0,1,2,4\}$. We will discuss some options for the recoding of the secondary radix digits separately in the following section.

Without considering the weight of 7 this gives us two groups of $\lceil (p+1)/5 \rceil$ partial products, each of which can be generated very easily. For the group of partial products generated by the low order digits $d_{i,0}$ these are already the final values for the partial products.

The group of partial products generated by the high order digits $d_{i,1}$ additionally have to be multiplied by 7. There are two options where this multiplication could be computed: On one hand the multiplicand <a> can be multiplied by 7 before the partial product reduction which leads to Architecture I. FIG. 2A depicts a block diagram corresponding to this implementation radix-32 using the pre-computation of the 7×<a> multiple. The multiplication of <a> by 7 is computed by the following sum:

$$7 \cdot \langle a \rangle = 8 \cdot \langle a \rangle - \langle a \rangle$$
$$= \langle a[p-1:0], 00 \rangle + \langle 11, \overline{a[p-1:0]} \rangle + 1.$$

On the other hand the group of partial products generated by the high order digits could be multiplied by 7 after these partial products already have been compressed to a carry-save representation which corresponds to Architecture II. FIG. 2B depicts a block diagram corresponding to this implementation radix-32 using the post-computation of the 7× multiple. Also in this case the formula 7·x=8·x−x is used to compute the 7× multiple, but this time it is not computed using <a>, but it is computed using the carry-save representation of the sum of the terms that have been generated by the high order digits. In this way the 4 partial products from the carry-save representations of the two groups are extended to 6 partial products, which are then reduced to the carry-save representation of the product in a final 6:2 reduction step. Note, that for the implementation of Architecture II the input of the multiplicand <a> is required later than the input of the multiplier <b>. With the partitioning suggested in FIG. 2B this makes a difference of a whole cycle in which the second operand is not needed. An operand that is fed back from a multiplier result only requires one cycle in the partial product generation and reduction for this proposed partitioning.

Radix-32 Recoding Options

The overall goal of recoding is to obtain the final operand encoding, which for the secondary radix representation from the previous section may be stated and solved as follows:

Primary radix-32, Secondary radix-7 Recoding: Given the 6-bit input $b_4 b_3 b_2 b_1 b_0 b_{-1}$, determine the 7-bit output $s_7 x_{14} x_7 s_1 x_4 x_2 x_1$ as specified in Table 2, where $-16 \leq d \leq 16$ is given by $$d = (-1)^{s_7} \cdot (14x_{14} + 7x_7) + (-1)^{s_1} \cdot (4x_4 + 2x_2 + x_1)$$
$$= -16b_4 + 8b_3 + 4b_2 + 2b_1 + b_0 + b_{-1}.$$

A first solution is a direct table lookup.

I. Direct Table Lookup Solution: Note that $s_7 = b_4$, and use $b_4 b_3 b_2 b_1 b_0 b_{-1}$ as input to a 6-bits-in 6-bits-out lookup table to obtain $x_{14} x_7 s_1 x_4 x_2 x_1$.

Time: 6-bit lookup

Table Size: 48 bytes per radix-32 digit, with 624 bytes for parallel 13 radix-32 digit operand recoding of a 64 bit operand.

Note that negation of d is obtained by complementing the input $b_4b_3b_2b_1b_0b_{-1}$, which complements the output signs but not the output magnitude, as may be observed in the top to bottom symmetry of Table 2. This provides a solution halving the table size.

II. Complementary Table Lookup Solution:
(i) Use bit $b_4$ to conditionally complement the string $b_3b_2b_1b_0b_{-1}$.
(ii) Use the conditionally complemented string as input to a 5-bits-in 6-bits-out lookup-table to obtain $x_{14}x_7s'_1x_4x_2x_1$.
(iii) Set $s_7=b_4$ and $s_1=b_4 \oplus s'_1$.

Time: An XOR-gate plus 5-bit lookup, assuming the subsequent XOR-gate determining $s_1$ is computed off the critical path since a PPG can select the magnitude before it complements.

Table Size: 24 bytes per radix-32 digit, with 312 bytes for a 64-bit operand recoding.

The table may be compressed by ⅓ and decompressed at a cost of one logic level.

III. Complementary Compressed Table Lookup Solution:
(i) Use bit $b_4$ to conditionally complement the string $b_3b_2b_1b_0b_{-1}$.
(ii) Use the conditionally complemented string as input to a 5-bits-in 4-bits-out lookup-table to obtain $x_7s'_1b'_1b'_0$.
(iii) Determine the output bits as follows:

$$s_7 = b_4$$

$$x_{14} = \neg x_7 \cdot (b_4 \oplus b_3)$$

$$x_7 = x_7$$

$$s_1 = b_4 \oplus s'_1$$

$$x_4 = b'_1 \cdot b'_0$$

$$x_2 = -b'_1 \cdot b'_0$$

$$x_1 = -b'_1 \cdot b'_0$$

Time: Two logic levels plus 5-bit lookup.

Table Size: 16 bytes per radix 32 digit, with 208 bytes for a 64-bit operand recoding.

It should be clear to one skilled in the art that other secondary radix systems can be employed according to this invention. A system with primary radix 256 and secondary radix 11 is readily constructed. Alternatively to representing the signed radix-256 digits with the fixed secondary radix-11, one could also choose a mixed radix representation for the signed digits $d_i$. For example also in the mixed secondary radix system 55-11-1, where the three digits $d_{i,2}$, $d_{i,1}$ and $d_{i,0}$ have the weights 55, 11 and 1, all digits can be chosen to be either a power of two or zero. More details on the foundations for such choices are given in the paper [Proc. IEEE Int. Symp. on Comp. Arith. (Arith15), *Binary Multiplication Radix-32 and Radix-256*, pp. 23–32, 2001].

FIG. 3 is a block diagram of one circuit embodiment capable of performing the method of multiplication of the current invention. Referring to FIG. 3, a circuit, indicated generally as 30, is indicated to have received the 64-bit multiplier in the A-Latch 33 and the 64-bit multiplicand in th B-Latch 35. The A-Latch has an additional 0 bit at each end extending from $a_{-1}$ to $a_{64}$. For i=0 . . . 12, a 6-tuple of bits ($a_{5i-1}$, $a_{5i}$, $a_{5i+1}$, $a_{5i+2}$, $a_{5i+3}$, $a_{5i+4}$) is extracted for recoding in the secondary radix to obtain the 2 radix 7 digits $d_{1i}$, $d_{0i}$ according to the recoding Table 2. Thus bits ($a_{-1}$, $a_0$, $a_1$, $a_2$, $a_3$, $a_4$) are sent to recoder 49 to obtain $d_{1,0}$ and also are sent to recoder 62 to obtain $d_{0,0}$; and so on with bits ($a_{59}$, $a_{60}$, $a_{61}$, $a_{62}$, $a_{63}$, $a_{64}$) sent to recoder 37 to obtain $d_{1,12}$ and also sent to recoder 50 to obtain $d_{0,12}$.

The recoded digit $d_{1,0}$ denoting a value in the set $\{-2,-1,0,1,2\}$ from Recoder 49 is sent to the PPG selector 75 which also receives the 64 bit multiplicand from the B-Latch 35. The PPG operates as a standard Booth 4 PPG generating the value $d_{1,0} \times$(multiplicand) and sends it to the appropriate adder input of the left half of the multipliers adder tree. Similarly, the digits $d_{1,1}$, $d_{1,2}$, . . . $d_{1,12}$ are sent to corresponding PPGs (63–75) for selection of 13 partial products to be summed in the left half adder tree 91. The output of the 13:2 PPR tree 91 is in redundant binary form and is multiplied by 7 by sending 8 times the value (shift by 3) and minus 1 times the value (compliment) each as a redundant binary value into the 6:2 PPR tree 95.

The recoded digit $d_{0,0}$ denoting a value in the set $\{-4,-2,-1,0,1,2,4\}$ from Recoder 62 is sent to the PPG selector 88 which also receives the 64 bit multiplicand from the B-Latch 35. The PPG operates as a modified Booth 8 PPG (modified to exclude digits 3, −3) generating the value $d_{1,0} \times$(multiplicand) and sends it to the appropriate adder input of the right half of the multiplier's adder tree. Similarly, the digits $d_{0,1}$, $d_{0,2}$, . . . $d_{0,12}$ are sent to corresponding PPGs (76–88) for selection of 13 partial products to be summed in the right half adder tree 93. The output of the 13:2 PPR tree 93 is in redundant binary form and is sent in redundant form to the 6:2 PPR tree 95. The output of the 6:2 PPR tree 95 in redundant binary form is sent to carry propagate adder 97 to finish the partial product accumulation and provide the 128 bit product on output line 98.

FIG. 4 provides a block diagram of a further embodiment of our invention. The multiplier circuit of FIG. 4 computes 7× as a precomputation step before selection of the partial products for insertion into the adder tree of the multiplier. The design is similar to Booth radix 8 where the 3× computation precedes selection by the PPGs. The principle advantage is apparent in that only one version of the multiplicand is sent to each PPG so that the routing complexity is similar to that of a Booth radix 4 multiplier where here the size of the adder tree is reduced by over 15% compared to Booth radix 4.

In conclusion the present invention provides a new methodology for multiplier recodings reducing the size of the multiplier's adder tree without requiring two or more hard multiples of the multiplicand to be sent to each PPG.

Although the present invention has been described in detail with regards to a particular secondary radix system, it should be understood that various changes, substitutions, and alterations in the secondary radix recoding process can be made hereto without departing from the invention as defined by the appended claims.

What is claimed is:

1. An apparatus for higher radix binary multiplication of a multiplicand by a multiplier to form a resultant product, said apparatus comprising:
   means for recoding the multiplier into a plurality of primary digits in a primary radix;
   means for recoding each of said primary digits into respective secondary digits in a second plurality of digits in a secondary radix;
   means for generating a partial product of each secondary digit and said multiplicand, the partial products for the respective secondary digits collectively comprising a first plurality of partial products;
   means for partitioning said first plurality of partial products into a plurality of parts and reducing each said part to respective values;
   means for generating a second plurality of partial products, each partial product of said second plurality of partial products comprising the product of a respective value of a respective part and of a term dependent on said respective part and the secondary radix; and means for reducing the second plurality of partial products to said resultant product.

2. The apparatus according to claim 1, wherein said primary radix is 32, and said secondary radix is 7, and said second number of digits in said secondary radix is 2, and said first plurality of partial products is partitioned into 2 parts.

3. The apparatus according to claim 1, wherein said primary radix is 256, and said secondary radix is 11, and said second number of digits in said secondary radix is 3, and said first plurality of partial products is partitioned into 3 parts.

4. The apparatus according to claim 1, wherein said means for partitioning reduces said respective values for each said part into a redundant binary format.

5. A method for higher radix binary multiplication, said method comprising the steps of:
    receiving a multiplier and a multiplicand;
    recoding the multiplier by extracting bits from the multiplier and obtaining first recoded digits from a first conversion table;
    recoding the multiplier by extracting bits from the multiplier and obtaining second recoded digits from a second conversion table;
    generating first partial products by selecting the first recoded digits in a Booth 4 partial product generator;
    generating second partial products by selecting the second recoded digits in a Booth 8 partial product generator;
    adding the first partial products to form a first result and multiplying the first result by 7 to form a second result;
    adding the second partial products to form a third result; and
    adding the second result and the third result to form a final result.

6. The method of claim 5, wherein the multiplier and the multiplicand are 64-bit values and the final result is a 128-bit value.

7. The method of claim 5, wherein the step of recoding to form the first recoded digits extracts 13 6-tuples of bits and the step of recoding to form the second recoded digits extracts 13 6-tuples of bits.

8. An apparatus for higher radix binary multiplication, said apparatus comprising:
    means for receiving a multiplier and a multiplicand;
    means for recoding the multiplier by extracting bits from the multiplier and obtaining first recoded digits from a first conversion table;
    means for recoding the multiplier by extracting bits from the multiplier and obtaining second recoded digits from a second conversion table;
    means for generating first partial products by inputting the first recoded digits and the multiplicand into a Booth 4 partial product generator;
    means for generating second partial products by inputting the second recoded digits and the multiplicand into a Booth 8 partial product generator;
    means for adding the first partial products to form a first result and multiplying the first result by 7 to form a second result;
    means for adding the second partial products to form a third result; and
    means for adding the second result and the third result to form a final result.

9. The apparatus of claim 8, wherein the multiplier and the multiplicand are 64-bit values and the final result is a 128-bit value.

10. The apparatus of claim 8, wherein the means for recoding to form the first recoded digits extracts 13 6-tuples of bits and the means for recoding to form the second recoded digits extracts 13 6-tuples of bits.

11. An apparatus for higher radix binary multiplication, said apparatus comprising:
    a plurality of recoders;
    a plurality of Booth 4 partial product generator selectors, connected to the recoders;
    a plurality of Booth 8 partial product generator selectors, connected to the recoders,
    an adder connected to the Booth 4 partial product generator;
    an adder connected to the Booth 8 partial product generator selector,
    a multiplier connected to the adder connected to the Booth 4 partial product generator; and
    a carry propagate adder, connected to the adders and said multiplier.

12. A method for higher radix binary multiplication, said method comprising:
    receiving a multiplier and a multiplicand;
    recoding the multiplier by extracting bits from the multiplier and obtaining first recoded digits from a first conversion table;
    recoding the multiplier by extracting bits from the multiplier and obtaining second recoded digits from a second conversion table;
    multiplying the multiplicand by 7 to form a first result;
    generating first partial products by selecting the first result in a Booth 4 partial product generator;
    generating second partial products by selecting the second recoded digits in a Booth 8 partial product generator; and
    adding the first partial products and the second partial products to form a final result.

13. The method of claim 12, wherein the multiplier and the multiplicand are 64-bit values and the final result is a 128-bit value.

14. The method of claim 12, wherein the step of recoding to form the first recoded digits extracts 13 6-tuples of bits and the step of recoding to form the second recoded digits extracts 13 6-tuples of bits.

15. An apparatus for higher radix binary multiplication, said apparatus comprising:
    means for receiving a multiplier and a multiplicand;
    means for recoding the multiplier by extracting bits from the multiplier and obtaining first recoded digits from a first conversion table;
    means for recoding the multiplier by extracting bits from the multiplier and obtaining second recoded digits from a second conversion table;
    means for multiplying the multiplicand by 7 to form a first result;
    means for generating first partial products by inputting the first result and a first recoded digit into a Booth 4 partial product generator;
    means for generating second partial products by inputting the first result and respective second recoded digits into respective Booth 8 partial product generators; and
    means for combining the first partial products and the second partial products to form a final result.

16. The apparatus of claim 15, wherein the multiplier and the multiplicand are 64 bit values and the final result is a 128-bit value.

17. The apparatus of claim 15, wherein the means for recoding to form the first recoded digits extracts 13 6-tuples of bits and the means for recoding to form the second recoded digits extracts 13 6-tuples of bits.

18. An apparatus for higher radix binary multiplication, said apparatus comprising:
- a plurality of recoders;
- a plurality of Booth 4 partial product generator selectors, connected to the recoders;
- a plurality of Booth 8 partial product generator selectors, connected to the recoders;
- a multiply connected to the Booth 8 partial product generator selectors; and
- a carry propagate adder, connected to the Booth 4 partial product generator selectors and the Booth 8 partial product generator selectors.

* * * * *